US010086555B2

United States Patent
Kessler et al.

(10) Patent No.: US 10,086,555 B2
(45) Date of Patent: Oct. 2, 2018

(54) METHOD FOR FORMING A LAMINATED PART

(75) Inventors: Patrick J. Kessler, Saint Joseph, MI (US); Heather L. Rittenhouse, Portage, MI (US); James Alongi, Carol Stream, IL (US); Paul Alongi, Carol Stream, IL (US)

(73) Assignee: Whirlpool Corporation, Benton Harbor, MI (US)

( * ) Notice: Subject to any disclaimer, the term of this patent is extended or adjusted under 35 U.S.C. 154(b) by 1022 days.

(21) Appl. No.: 13/465,253

(22) Filed: May 7, 2012

(65) Prior Publication Data

US 2013/0105077 A1    May 2, 2013

Related U.S. Application Data

(60) Provisional application No. 61/551,975, filed on Oct. 27, 2011.

(51) Int. Cl.
| | |
|---|---|
| *B29C 51/16* | (2006.01) |
| *B29C 51/42* | (2006.01) |
| *B29K 705/00* | (2006.01) |
| *B29C 51/06* | (2006.01) |
| *B29C 51/46* | (2006.01) |
| *B29K 105/00* | (2006.01) |

(Continued)

(52) U.S. Cl.
CPC .............. *B29C 51/16* (2013.01); *B29C 51/06* (2013.01); *B29C 51/08* (2013.01); *B29C 51/14* (2013.01); *B29C 51/421* (2013.01); *B29C 51/427* (2013.01); *B29C 51/46* (2013.01); *B29C 2791/006* (2013.01); *B29C 2791/007* (2013.01); *B29K 2105/0097* (2013.01); *B29K 2705/00* (2013.01)

(58) Field of Classification Search
CPC ........ B29C 2791/006; B29C 2791/007; B29C 51/10; B29C 65/1432; B29C 35/16; B29C 51/18; B29C 51/16; B29C 51/14; B29C 51/08; B29C 51/06; B29C 51/46; B29C 51/427; B29C 51/421; B29K 2105/0097; B29K 2705/00
USPC ................. 156/60, 285, 244.21, 244.27, 382
See application file for complete search history.

(56) References Cited

U.S. PATENT DOCUMENTS

| | | | |
|---|---|---|---|
| 4,230,764 A | 10/1980 | Figge et al. | |
| 4,818,589 A | * 4/1989 | Johnson ................... | B05D 1/28 |
| | | | 156/230 |
| 4,824,506 A | 4/1989 | Hoerner et al. | |

(Continued)

FOREIGN PATENT DOCUMENTS

| | | |
|---|---|---|
| CN | 101750279 A | 6/2010 |
| EP | 0201303 A2 | 11/1986 |

(Continued)

OTHER PUBLICATIONS

European Search Report for Corresponding EP 12189889.4, Feb. 13, 2013.

*Primary Examiner* — Michael N Orlando
*Assistant Examiner* — Cynthia L Schaller (57) ABSTRACT

A method for thermoforming a laminate to a part by controlling the temperature and pressure during the thermoforming. The laminate to be thermoformed may include an adhesive layer and the part may be a metal article. A thermoforming box may be used to control one of the temperature and the pressure.

31 Claims, 6 Drawing Sheets

(51) Int. Cl.
  *B29C 51/08* (2006.01)
  *B29C 51/14* (2006.01)

(56) References Cited

U.S. PATENT DOCUMENTS

| | | | |
|---|---|---|---|
| 4,828,637 A | 5/1989 | Mentzer et al. | |
| 4,838,973 A | 6/1989 | Mentzer et al. | |
| 4,868,030 A * | 9/1989 | Mentzer et al. | 428/174 |
| 4,957,802 A | 9/1990 | Mentzer et al. | |
| 4,981,631 A | 1/1991 | Cheung et al. | |
| 5,030,504 A | 7/1991 | Botsolas et al. | |
| 5,034,077 A | 7/1991 | Pata | |
| 5,125,994 A | 6/1992 | Harasta et al. | |
| 5,448,404 A | 9/1995 | Schrenk et al. | |
| 6,450,793 B1 * | 9/2002 | De Nichilo | B29C 51/427 264/544 |
| 6,565,955 B2 | 5/2003 | Fields et al. | |
| 6,788,463 B2 | 9/2004 | Merrill et al. | |
| 6,851,943 B1 | 2/2005 | Novosat | |
| 6,858,287 B2 | 2/2005 | Fields | |
| 6,929,711 B2 | 8/2005 | Benninger | |
| 7,005,103 B2 | 2/2006 | Smith et al. | |
| 7,390,454 B2 | 6/2008 | Ostrander et al. | |
| D595,965 S | 7/2009 | Kim et al. | |
| 7,708,932 B2 | 5/2010 | Wykoff et al. | |
| 7,837,911 B2 | 11/2010 | Bristow et al. | |
| 7,854,985 B2 | 12/2010 | Song et al. | |
| 8,021,135 B2 | 9/2011 | Anbarasu et al. | |
| 8,062,451 B2 | 11/2011 | Mozer et al. | |
| 2002/0054961 A1 | 5/2002 | Spain et al. | |
| 2006/0284350 A1 * | 12/2006 | Buehler et al. | 264/553 |
| 2007/0116903 A1 | 5/2007 | Song et al. | |
| 2007/0148384 A1 | 6/2007 | Bowden et al. | |
| 2008/0094707 A1 | 4/2008 | Tsukane et al. | |
| 2008/0311370 A1 | 12/2008 | Tatarka | |
| 2009/0099313 A1 | 4/2009 | Uradnisheck | |
| 2010/0047597 A1 | 2/2010 | Seta | |
| 2010/0212813 A1 | 8/2010 | Mozer et al. | |
| 2011/0249325 A1 | 10/2011 | Zehentmaier et al. | |

FOREIGN PATENT DOCUMENTS

| | | |
|---|---|---|
| EP | 0202041 A2 | 11/1986 |
| EP | 0302703 A2 | 2/1989 |
| EP | 2324991 A2 | 5/2011 |
| FR | 2842469 A1 | 1/2004 |
| JP | 57070610 A | 5/1982 |
| JP | 2215517 A | 8/1990 |
| JP | 10058536 A | 3/1998 |
| JP | 2001113542 A | 4/2001 |
| JP | 2004237510 A | 8/2004 |
| JP | 2007160841 A | 6/2007 |
| JP | 2007276169 A | 10/2007 |
| JP | 2008007789 A | 1/2008 |
| WO | 9929504 A1 | 6/1999 |
| WO | 0132400 A1 | 5/2001 |
| WO | WO-03/041945 A1 * | 5/2003 |
| WO | 2006105999 A1 | 10/2006 |
| WO | 2010122826 A1 | 10/2010 |
| WO | 2011151200 A1 | 12/2011 |

* cited by examiner

METHOD FOR FORMING A LAMINATED PART

CROSS REFERENCE TO RELATED APPLICATIONS

The present application claims the benefit of U.S. Provisional Patent Application No. 61/551,975, filed Oct. 27, 2011, which is incorporated herein by reference in its entirety.

BACKGROUND OF THE INVENTION

A formed part, such as the top cover or front panel of home appliances or a center console of automotive vehicles, may require a final finish on the exterior of the formed part to provide an aesthetic touch or functional purpose. The formed parts may include a metallic part such as a steel part, or a non-metallic part. The formed part may be formed by molding, stamping, or thermoforming.

For large parts such as car doors, refrigerator doors, and dishwasher doors, for example, thermoforming a laminate to the part has resulted in unwanted tearing, or rippling of the laminate as it is stretched over the part, resulting in an unacceptable product. While such tearing and rippling occurs relatively infrequently for smaller parts, such as laptop cases, the thermoforming techniques used for smaller parts have not provided satisfactory results for larger parts.

SUMMARY OF THE INVENTION

An embodiment of the invention includes a method of applying a laminate having an adhesive layer to a contoured surface of an article.

DESCRIPTION OF EMBODIMENTS OF THE INVENTION

Embodiments of the invention are generally directed toward the method of thermoforming a laminate to a part. Including thermoforming the laminate to a metallic part used in home appliances such that the laminate provides the metallic part with a final finish which meets at least one of an aesthetic and functional purpose.

Embodiments of the invention address the problem of thermoforming the laminate to the exterior of a large part without adversely impacting the quality of the laminate such as tearing, creasing, or delamination.

Figure 1:
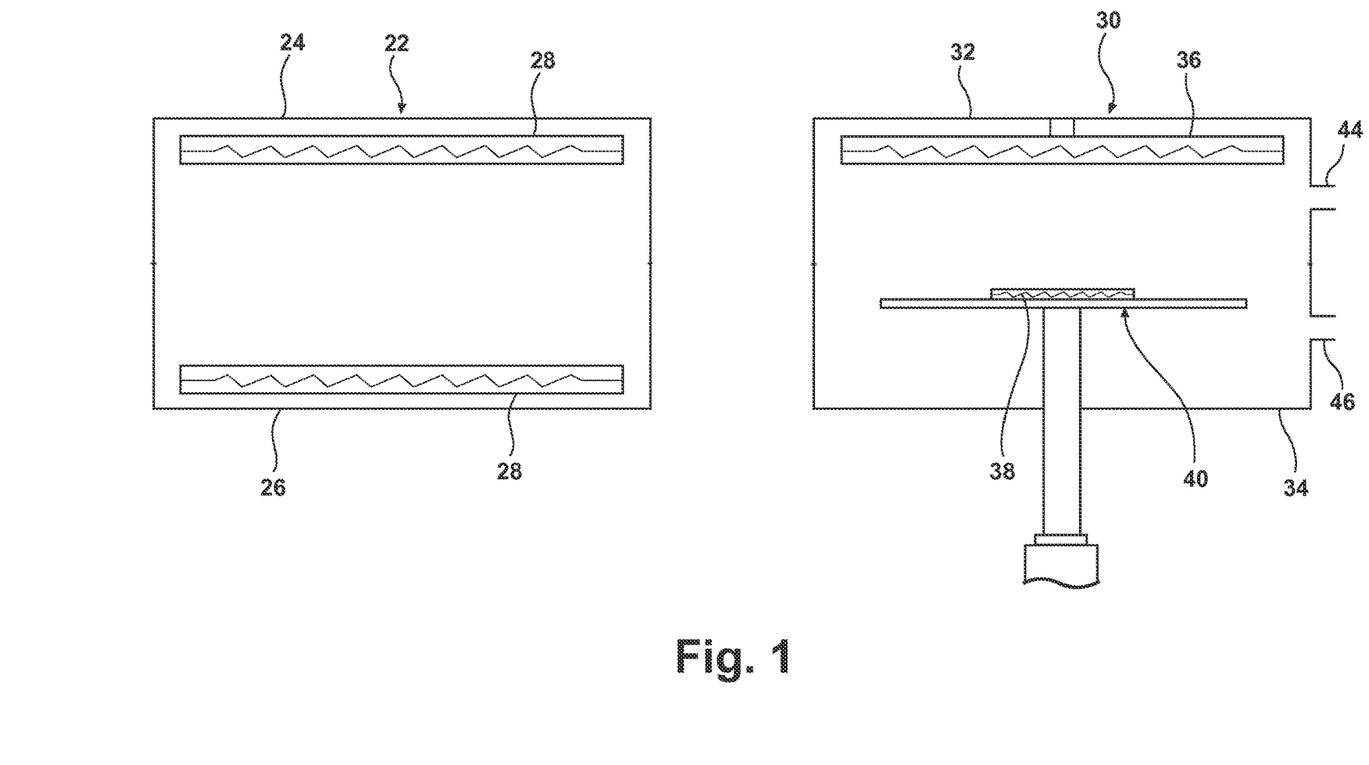
FIG. 1 is a schematic view of a heating oven and a thermoforming box, which are used for laminating a laminate to a large part.

FIG. 1 schematically illustrates a heating oven 22 and a thermoforming box 30 used for laminating a laminate to a large part. As illustrated, the heating oven 22 may include a separating upper half 24 and a lower half 26 to open and close the heating oven 22. The heating oven 22 may also include one or more heating elements 28 coupled to the upper half 24 and the lower half 26, respectively.

The thermoforming box 30 may also include a separating upper half 32 and lower half 34. A heating element 36 may be coupled to the upper half 32 to provide a predetermined amount of heat energy. A buck 40 may be operably coupled to the lower half 34 and may be configured to move upwardly or downwardly relative to the lower half 34. The buck 40 may include high molecular weight plastic or thermally conductive materials and may include a plurality of vacuum openings (not shown) through which a vacuum may be drawn against an object lying on the buck 40. Further, the buck 40 may be coated with a non-stick coating, such as Teflon, to aid in removal of the large part 31. The buck 40 may also include an external heating source such as a heating element 38 or temperature controller to apply heat energy to the part (not shown) coupled to the buck 40.

The thermoforming box 30 may include at least two conduits 44, 46, each of which may be coupled to the upper half 32 and the lower half 34, respectively. The two conduits 44, 46 may be further operably coupled to pressure systems for increasing or decreasing the pressure within the interior of the thermoforming box 30. Such pressure systems may include a vacuum pump to create the negative pressure.

FIGS. 2 through 8 illustrate portions of a thermoforming process for applying a laminate to a large part according to one embodiment of the invention. It may be understood that the sequence of steps depicted in FIGS. 2 through 8 is for illustrative purposes only and is not meant to limit the method in any way as it is understood that the steps may proceed in a different logical order, additional or intervening steps may be included, or the described steps may be divided into multiple steps, without detracting from the embodiments of the invention.

Figure 2:
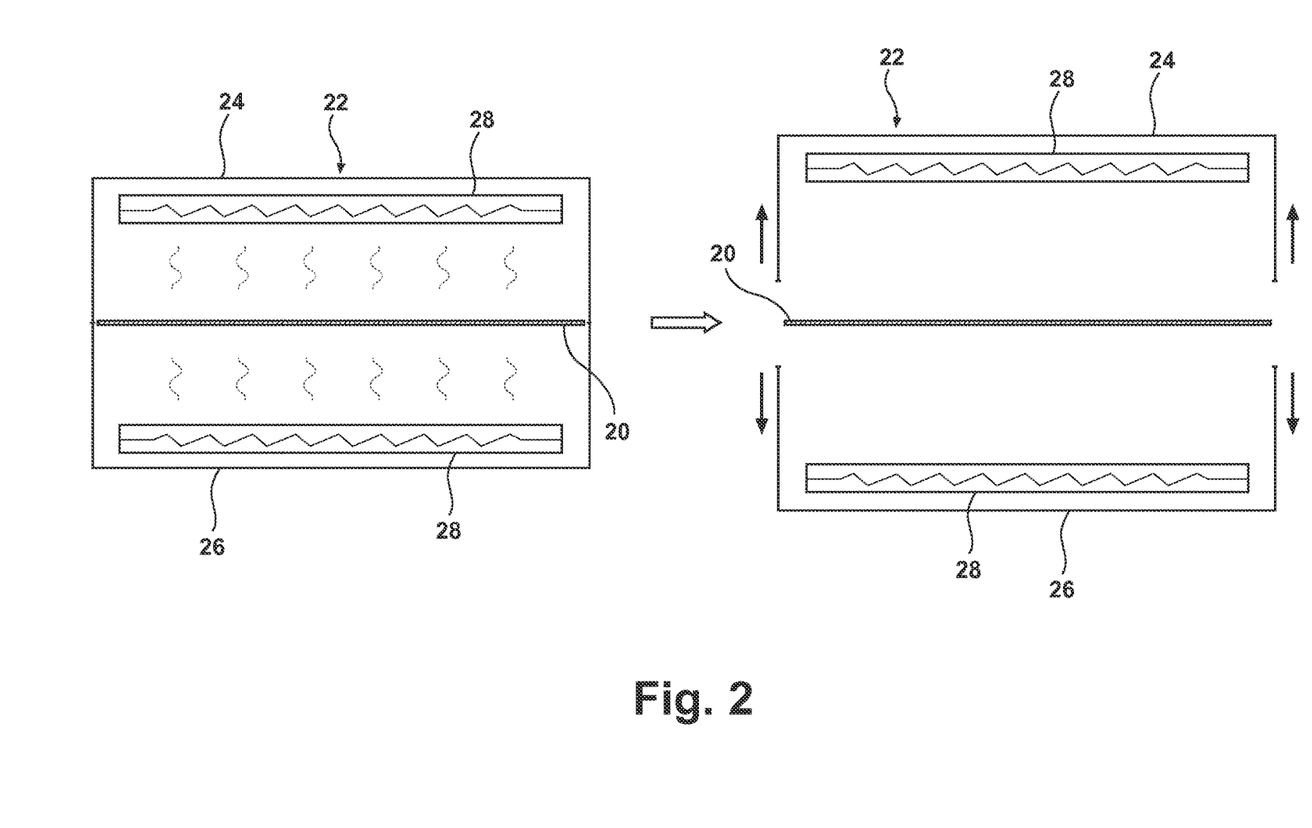
FIG. 2 schematically illustrates a pre-heating treatment where the laminate is pre-heated in the oven.

FIG. 2 schematically illustrates a pre-heating treatment for a laminate 20 before thermoforming of the laminate 20. The laminate 20 may be initially cut to a predetermined size from the laminate roll before the laminate 20 is moved to a clamp frame or other suitable means coupled to any transfer system (not shown) to the heating oven 22.

The laminate 20 may include multilayered films including at least one of a protection layer, a decoration layer, an adhesive layer, and a release film. Exemplary multilayered laminates are disclosed in U.S. Pat. Nos. 7,854,985, 6,565, 955, and U.S. Pat. No. 6,858,287. The protection layer may include Poly(methyl methacrylate) (PMMA) or any other suitable polymer material. The decoration layer may include a metallic layer or polymer layer such as polyvinylidene fluoride (PVDF), polyvinyl chloride (PVC), acrylonitrile butadiene styrene (ABS), or others as necessary. The adhesive layer may include an adhesive which is configured to adhere to an adjacent material based on at least one of the temperatures and pressures on the adhesive layer. The release film may be delaminated before the adhesive layer is heat treated in the heating oven 22.

The two halves 24, 26 of the oven 22 may be separated such that the laminate 20 may be placed within the heating oven 22. The heating oven 22 may then be closed and the heaters 28 may be energized to heat the laminate 20 to a predetermined temperature for a predetermined time period. In the case of the laminate 20, which may have a metallic decoration layer, the laminate 20 may be heated up to approximately 160° C. (320° F.) (i.e. the appropriate processing temperature for that class of material) for approximately 1.5 to 3 minutes. Other heating conditions may be used for other laminates having a different stack layer. For example, a laminate 20 having a polymer decoration layer may require lower heat energy than the laminate having the metallic decoration layer therein. The pre-heating temperature is typically a function of the thermoforming temperature of the particular laminate 20 being used, which is either provided by the manufacturer or may be experimentally determined.

The laminate 20 may be heated by the heaters 28 from either or both the top and bottom sides of the laminate 20.

Once the pre-heating of the laminate 20 is completed, the heating oven 22 may open in anticipation of transferring the laminate 20 to the thermoforming box 30 for thermoforming. It is also contemplated that the laminate 20 may remain in the oven 22 and may be maintained at the pre-heat temperature, or any other suitable temperature, until the thermoforming box 30 is ready to receive the laminate 20.

Figure 3:
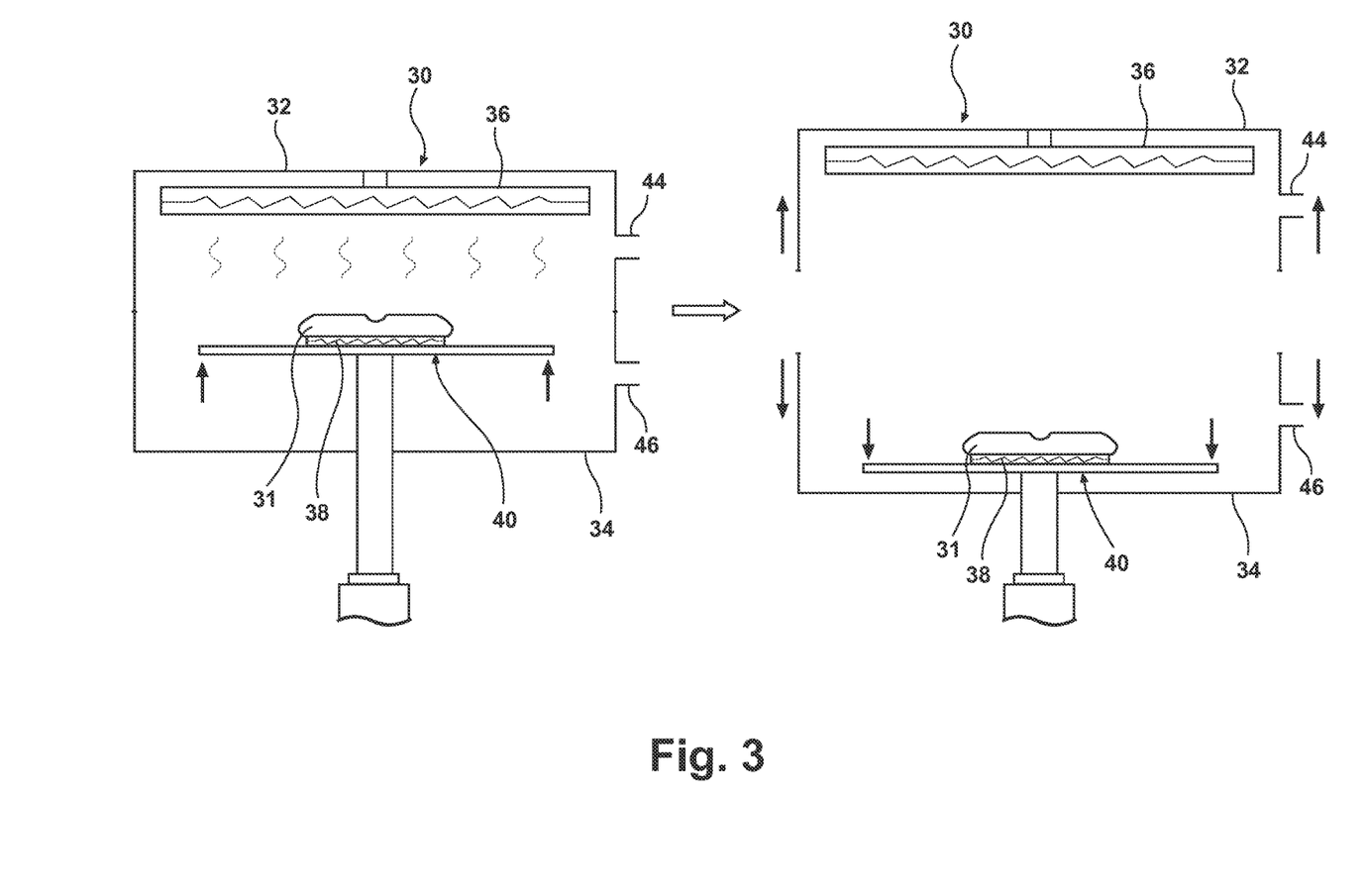
FIG. 3 schematically illustrates a pre-heating treatment step for the large part, in the form of a metallic part, in the thermoforming box.

As shown in FIG. 3, the large part 31 may also be preheated. This may be done concurrently or sequentially with the preheating of the laminate 20. The large part 31 may be preheated in the thermoforming box 30, which for shorter overall cycle time may done while the laminate 20 is preheated in the heating oven 22.

The large part 31 may be a metallic part such as a dishwasher, laundry treating appliance, automotive panel, or refrigerator. Typically the part 31 may include a cast, formed, drawn, or stamped metallic component of a home appliance. The part 31 may also include any plastic component of a home appliance or an automobile or other similar industrial applications.

As illustrated, the large part 31 may be loaded on the buck 40 positioned in the lower half 34. The large part 31 may be heated to a predetermined temperature by the heating element 38 or other heating source operably coupled to the buck 40 to provide the large part 31 with a predetermined amount of heat energy. For example, the heating element 38 may be configured to heat the large part 31 at approximately 76-94° C. (170-200° F.). The large part 31 may then be continuously heated at that temperature by the buck 40 through the end of the thermoforming process.

The large part 31 may also be provided with additional heat energy from the heating element 36 located in the upper half 32 or another external heating source. When the heating element 36 is turned ON, the large part 31 may move upwardly toward the heating element 36 to improve the radiant heat transfer from the heating element 36 to the large part 31. After the passage of a predetermined time period, the heating element 36 coupled to the upper half 32 may be turned OFF while the heating element coupled to the buck 40 may remain ON until the end of the thermoforming process. The large part 31, coupled to the buck 40, may be moved back downwardly to its original position and the thermoforming box 30 may open to receive the laminate 20, which was heated in the heating oven 22 in FIG. 2.

Figure 4:
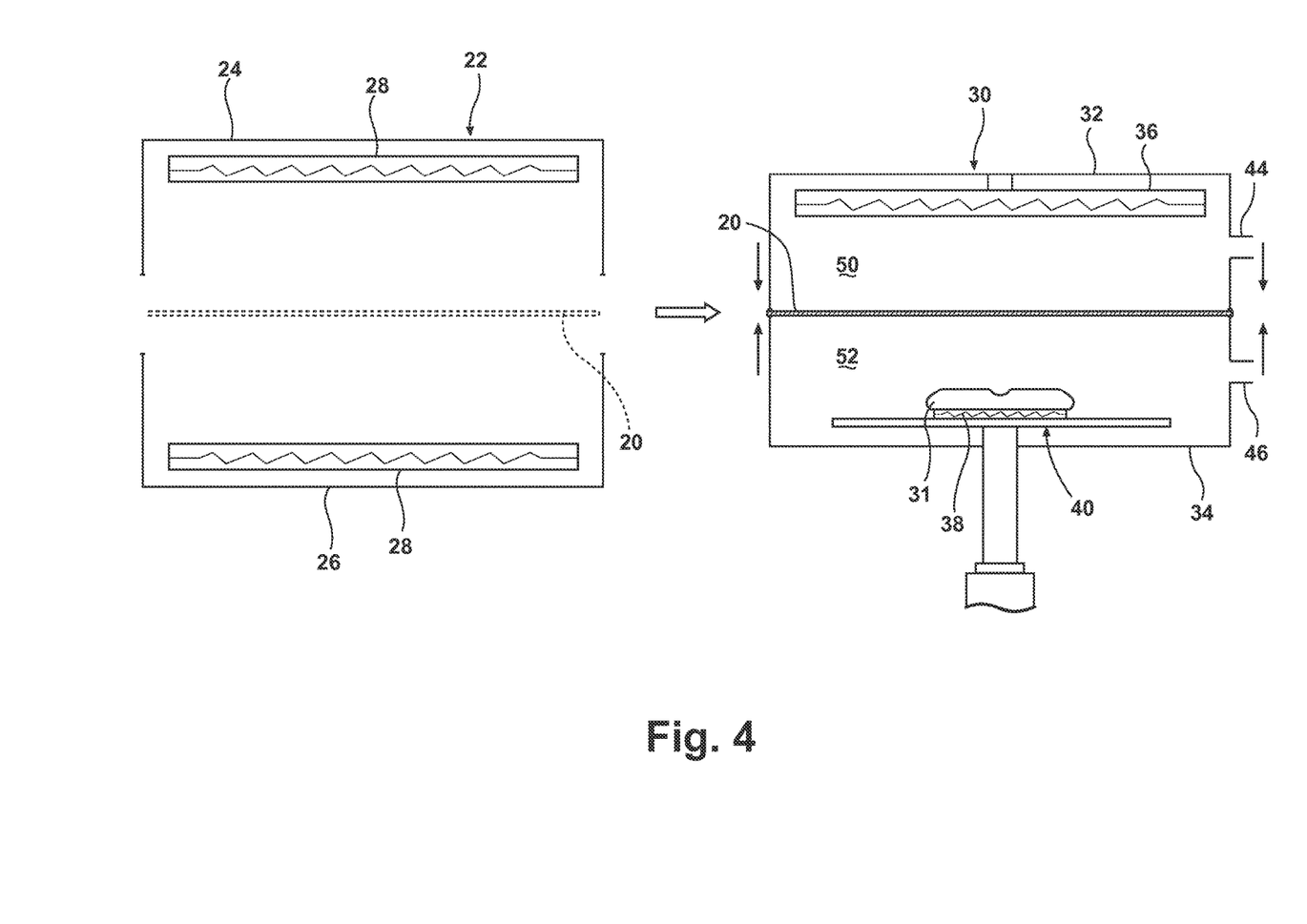
FIG. 4 schematically illustrates a transfer of the pre-heated laminate in the heating oven to the thermoforming box, which already contains the part.

FIG. 4 schematically illustrates a transfer of the pre-heated laminate 20 from the heating oven 22 to the thermoforming box 30 in which the large part 31 is already positioned to laminate the laminate 20 to the large part 31.

When the laminate 20 is transferred to the thermoforming box 30, a portion of the pre-heated laminate 20 may sag downwardly due to the relative size of the laminate 20, which is needed to cover the large part 31. The thermoforming box 30 may then be closed to form a seal along the edge of the laminate 20, which may separate the thermoforming box 30 into two portions, an upper portion 50 and a lower portion 52. The upper portion 50 may be a space formed by the upper half 32 and the laminate 20, while the lower portion 52 may be a space formed by the lower half 34 and the laminate 20.

Figure 5:
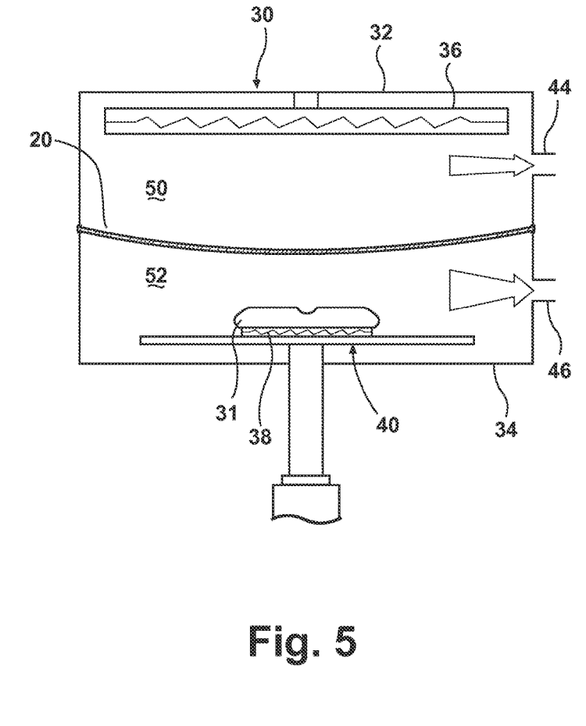
FIG. 5 schematically illustrates a vacuum phase where a low pressure, such as a vacuum, is applied on both sides of the laminate in the thermoforming box.

FIG. 5 schematically illustrates a vacuum phase where a low pressure, such as a vacuum, is applied on both sides of the laminate 20 in the thermoforming box 30. By vacuum, it is meant any air pressure lower than the atmospheric pressure of approximately 14.7 psi. The vacuum may be separately applied to the both upper portion 50 and lower portion 52 of the thermoforming box 30 through the conduits 44, 46 coupled to one or more vacuum pumps and valves (not shown).

It may be understood that, while applying the vacuum to the thermoforming box 30, the degree of vacuum for above and below the laminate 20 may be equal or configured to be different. As illustrated, a higher vacuum having a lower air pressure may be applied to the lower portion 52 and a lower vacuum having a higher air pressure may be applied to the upper portion 50 for the large part 31. For example, the lower portion 50 of the thermoforming box 30 may be provided with the degree of vacuum of approximately 0.5 psi and the upper portion 50 may be provided with the degree of vacuum slightly greater than 0.5 psi.

Under this condition, partly due to the pressure difference applied across the entire surface of the pre-heated laminate 20, sagging of the pre-heated laminate 20 may occur in the vertical direction to form a partially concave surface. For example, it was found that for laminate 20 having an area of 44×36 inches with an effective area of 1584 inch$^2$, approximately 3 inches of sagging in the center of the laminate 20 in the vertical direction may occur.

The sagging is sufficient to provide a pre-stretching of the laminate 20 while preventing the laminate from coming into initial contact with the large part 31. The degree of sagging is also determined by the required presentation of the laminate 20 to the large part 31 during forming.

While the pressures applied cause the laminate to deflect toward the large part 31 to effect the pre-stretching, it is possible to effect the pre-stretching by altering the pressure differential to create a convex surface that bows away from the large part 31. When the upper and lower portions 50, 52 have the same degree of vacuum, in the illustrated thermoforming box 30, gravity will naturally cause some sagging. It is contemplated that the differential vacuum may be controlled to prevent too much sagging of the laminate 20 and keep it relatively planar.

While the vacuum is applied on the laminate 20, the heating element 38 or by another external heating source may still be continuously turned ON to maintain the large part 31 at approximately 76-94° C. (170-200° F.).

Figure 6:
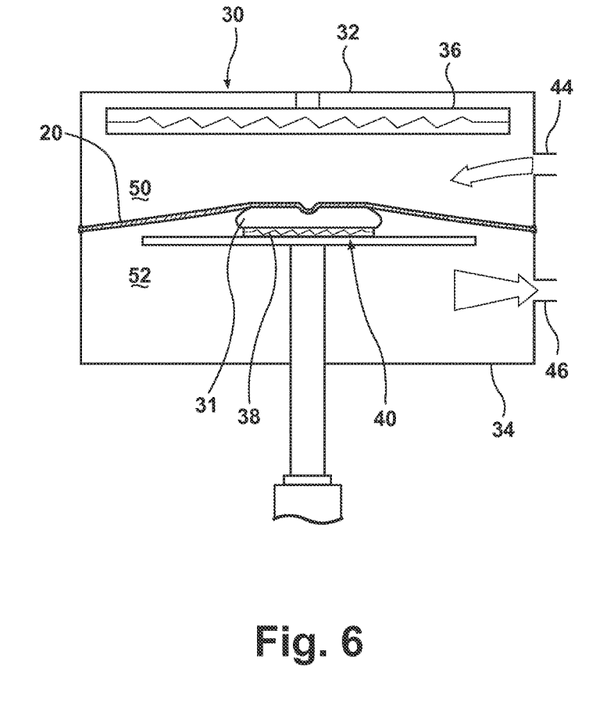
FIG. 6 schematically illustrates an upwardly movement of the part to the laminate, while the vacuum is exhausted above the laminate and a vacuum is maintained in the lower portion.

FIG. 6 schematically illustrates an upward movement of the large part 31 to the laminate 20, while the vacuum is exhausted above the laminate 20 and a vacuum is maintained in the lower portion 52 of the thermoforming box 30. As illustrated, the large part 31 coupled to the buck 40 may be configured to move upwardly by a predetermined length to initiate physical contact with the laminate 20 while maintaining the degree of vacuum in the both upper and lower portion 50, 52 of the thermoforming box 30. After the large part 31 makes contact with the laminate 20, the vacuum in the upper portion 50 may be exhausted to increase the pressure in the upper portion 50 from the vacuum to the atmospheric pressure, while maintaining the degree of vacuum in the lower portion 52 of the thermoforming box 30.

Once the vacuum exhausts in the upper portion 50 of the thermoforming box 30 the laminate 20 may also be provided with a pressure which corresponds to a pressure difference between the atmospheric pressure and the vacuum applied on the upper portion 50 across the surface of the laminate 20. The pressure difference may work as a driving force to push the laminate 20 toward the large part 31. The laminate 20 may then fully conform to the surface of the large part 31 for full coverage. Maintaining the vacuum in the lower portion 52 may be effective in further pulling the laminate 20 toward the large part 31.

Under this condition, a sagging portion of the laminate 20 may work advantageously in further fully conforming the laminate 20 to the surface of the large part 31. Additionally, vacuum openings (not shown) operably coupled to the buck 40, such as through the buck 40, may work advantageously in consuming any trapped air between the laminate 20 and the large part 31. It may be understood that while the upward movement of the buck 40 and exhaustion of vacuum may occur in a sequential order, they may alternatively occur practically at the same time.

The large part 31 may include openings (not shown), such as through the large part 31, which may allow for the escape of any trapped air between the laminate 20 and the large part 31 during application of the laminate 20. The openings may be intentionally included in portions of the large part 31, such as large surfaces of the large part 31, to allow air to be evacuated from such locations to aid in reducing the bubbling or rippling of the laminate 20. During application, air may be removed through the openings in the large part such that the laminate 20 may fully conform to the surface of the large part 31, this may include that a portion of the laminate 20 may be drawn into the openings in the large part 31.

Figure 7:
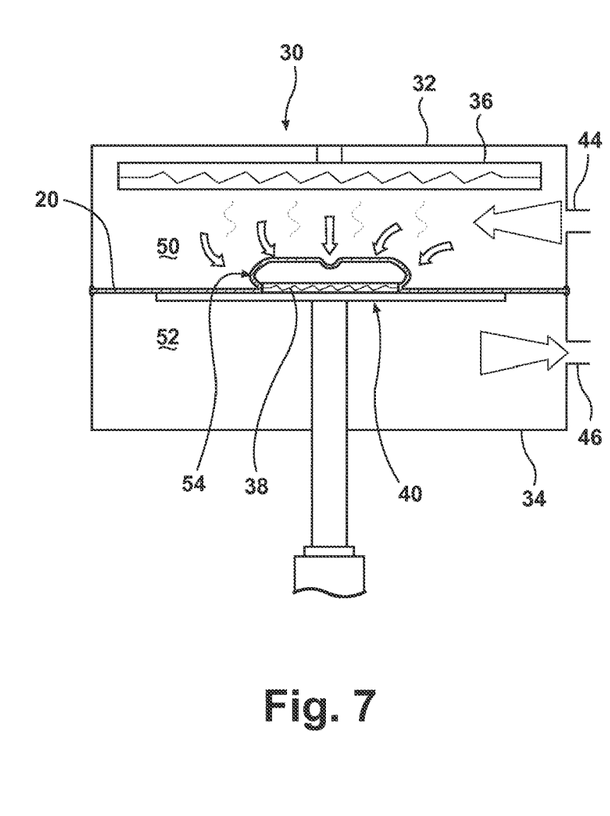
FIG. 7 schematically illustrates the bonding of the laminate on the part, with air pressure applied downwardly to the laminate.

After the laminate 20 fully conforms to the surface of the large part 31, the laminate 20 may be provided with the additional air pressure and heat energy to bond the laminate 20 on the surface of the large part 31, as illustrated in FIG. 7. For this, the adhesive layer in the laminate 20 may have an adhesive composition that is both temperature and pressure sensitive and adhesion may be effectuated by concurrently applying a predetermined pressure and temperature.

An air pressure of as much as 30 psi may be applied to the laminate 20 in the upper portion 50 of the thermoforming box 30 through the conduit 44. At the same time, the heating element 36 may be heated as high as 171° C. (340° F.), or a suitable temperature for that given material, to provide heat energy to fully bond the laminate 20 to the large part 31. Alternatively, the residual processing heat may be sufficient and the heating element 36 may be turned OFF.

The temperature for heating element 36 may be determined based on multiple parameters including an activation temperature of the adhesive in the laminate 20 or the maximum processing temperature limit of the laminate 20. For example, the temperature of the heating element 36 may be set to be greater than 121° C. (250° F.) to effect the activation of the adhesive in the laminate 20. In contrast, the temperature may not go up above 171° C. (340° F.), at which the laminate 20 may begin to crack.

It is noted that, in another example, the laminate may include an adhesive layer which may be sensitive to only one of temperature or pressure. In that case, the steps described in FIG. 7 may need to be adjusted accordingly. For example, if the adhesive layer is only temperature dependent, additional air pressure need not be applied.

Figure 8:
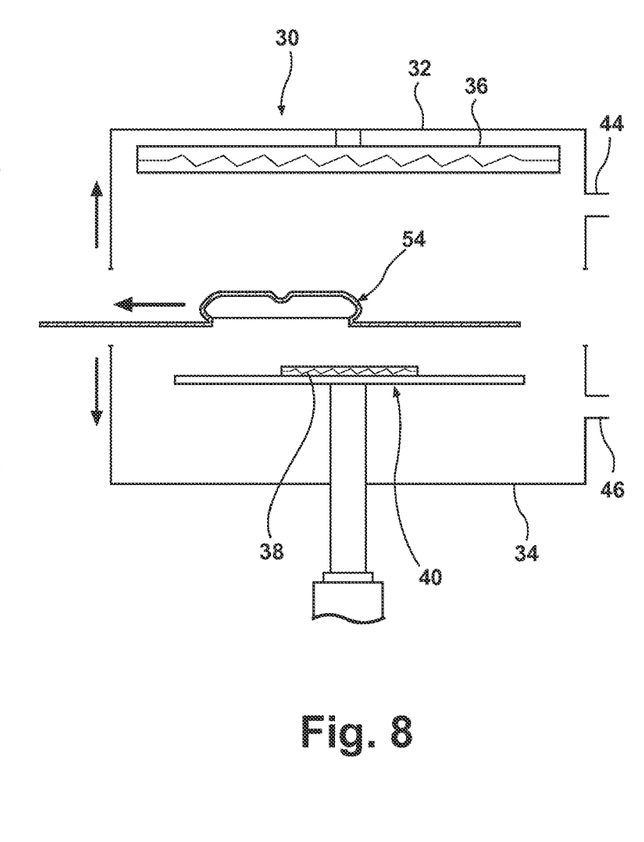
FIG. 8 schematically illustrates cooling and unloading of a laminated part after the heating elements are turned off and the vacuum on the lower half and pressure in the upper half are exhausted.

After the passage of a predetermined time period under a predetermined temperature and additional air pressure, the laminate 20 may bond to the surface of the large part 31 to form a laminated part 54. Then the heating elements 36, 38 may be turned OFF to cool down the laminated part 54. The pressure in the upper portion 50 and the vacuum in the lower portion 52 may also be exhausted to return the pressure in both the upper and lower portions 50, 52 to atmospheric pressure. After a predetermined time, the thermoforming box 30 may be opened to unload the laminated part 54 out of the thermoforming box 30, as illustrated in FIG. 8.

Another embodiment of the invention may include a method of applying a laminate having an adhesive layer to a contoured surface of an article. By way of example, the article may be a metal article or a non-metal article such as a plastic article. In the exemplary process, the article is a metal article, such as the front of an appliance, illustrative examples include a dishwasher, a refrigerator, and a clothes washer or dryer. Such a method may include heating the laminate to a first temperature corresponding to a thermoformable temperature for the laminate. As with the above described embodiment this may include heating both sides of the laminate or may include heating a single side of the laminate. The laminate may be pre-heated exteriorly of the thermoforming box or within the thermoforming box.

The laminate with the adhesive layer may be heated until the laminate reaches a predetermined draw ratio such as a predetermined draw ratio or is heated until a specific sag point is reached. The temperature at which a predetermined draw ratio or degree of sagging is reached will be laminate-dependent.

The adhesive may be a thermal adhesive, such as a hot melt adhesive, that will bond at a predetermined temperature. Typically, such adhesives are solid until heated to the predetermined bonding temperature, where the adhesive is suitable for bonding. The bonding temperature is typically adhesive-dependent.

The thermoformable temperature of the laminate is laminate-dependent because of the different characteristics of the laminate and the adhesive and is not limiting to the invention. However, for the metalized laminates described above, the temperature for the desired is near 76-154° C. (310° F.).

The article may be heated to a temperature above a bonding temperature such as an instantaneous bonding temperature of the adhesive forming the adhesive layer, but below the thermoformable temperature of the laminate. This may include that the article is heated in the range of temperatures near 76-94° C. (170° F.-200° F.). Heating the article may include placing the article on the buck where it may be heated in the thermoforming box. The article may be heated by heaters affixed to the thermoforming box as well as a recirculation heating element within the buck. This may include heating the buck to a temperature above an instantaneous bonding temperature for the adhesive but below the thermoformable temperature. Heating the article may also include pre-heating the article exteriorly of the thermoforming box. The article may then be maintained at the bonding temperature within the thermoforming box such as by the heated buck.

During the application of the laminate, the laminate is stretched and/or pulled over the surface of the article. If the article is not warm enough, the thermal adhesive will cool below the bonding temperature, effecting a bonding of at least parts of the laminate, before the laminate has been completely stretched and/or pulled over the surface of the article, which will lead to a rippling of the laminate that presents an unappealing appearance. Heating the steel before the laminate is applied may allow for proper adhesion.

As with the above described embodiment, the heated laminate may be positioned above the heated article such as in the thermoforming box. The thermoforming box may then be closed to form a seal along the edge of the laminate. Within the thermoforming box the laminate may fluidly separate the interior into a first portion, on one side of the laminate, and a second portion, on an opposite side of the laminate. Once sealed, the pressure in the first portion and the second portion may be changed to control the stretching of the pre-heated laminate. When the laminate is transferred to the thermoforming box, a portion of the pre-heated laminate may sag downwardly due to the relative size of the laminate, which is needed to cover the article.

To limit this stretching, by way of example only, a differential pressure may be applied to the laminate such that the greater pressure is in the lower portion. In the exemplary embodiment, the differential pressure is applied by applying a low pressure, less than atmospheric, on each side of the laminate, with the low pressure below the laminate being greater than the low pressure above the laminate. Other methods to apply the differential pressure include increasing the pressure in the lower portion, with or without a decreasing of the pressure in the upper portion.

To increase the stretching, the differential pressure may be applied such that the pressure above the laminate is increased relative to the pressure below the laminate. Given the effect of gravity, it is possible to increase stretching even when the pressure above the laminate is, in an absolute sense, less than the pressure below the laminate.

The heated laminate may then be rapidly applied onto the contoured surface of the article by applying a differential pressure across the laminate to conform or draw the laminate across the contoured surface of the article without ripples in the laminate. This may be done while the laminate is at the thermoformable temperature and the article is at the bonding temperature. The stretched shape, convex, of the laminate may be controlled by maintaining a differential pressure across the laminate.

In the exemplary process, the applying of the differential pressure is accomplished by applying a low pressure, less than atmospheric pressure, on both sides of the laminated, with the low pressure on a first side, the same side of the laminate as the article, being lower than the low pressure on the second side, opposite the first side, of the laminate to obtain the desired amount of sagging to pre-stretch the laminate. Applying the low pressure may be accomplished by evacuating fluid, such as air, from below and above the laminate when the box is initially exposed to atmospheric pressure during insertion of the article and/or laminate. The evacuation of the air may be accomplished by evacuating from the box, such as with a conduit coupled to a pump, or through the buck. The lower pressure on the lower side draws the laminate towards the article.

During or closely after evacuation of the air, pressure may be applied from above to rapidly form and apply the laminate across all geometries of the substrate. In the exemplary process, a high pressure, greater than the low pressure, may be applied to the second portion of the box on the second side of the laminate, while the pressure in the first portion on the first side of the laminate is held at a lower pressure or evacuated below atmospheric pressure. The high pressure may include a pressure of at least 1 atmosphere. In the exemplary process, applying the high pressure may include fluidly coupling the second side to atmosphere and bringing the upper portion to atmosphere and then fluidly sealing it to the atmosphere and pressurizing it to greater than one atmosphere. In this manner, applying the differential pressure may include evacuating air from below the laminate and pressurizing air above the laminate. This sharp increase in the pressure differential rapidly applies the laminate onto the article. Air pressure applied from the top side of the laminate aids in the stretching of the laminate in order to reach the desired shape/form of the article in accordance with the draw ratio for the part and laminate. The pressurized air forces the laminate into the convex shape towards the part below. The degree of convexness of the laminate can be controlled by the air to provide the desired draw ratio for the combination of the laminate and part.

Rapidly applying the laminate may include instantaneously applying the laminate. Such instantaneously applying the laminate may include applying the laminate within 3 seconds and more preferably within 0.5 seconds. Rapidly applying the laminate may also include applying the laminate before any portion of the adhesive falls below the bonding temperature. Air being evacuated through the buck may also aide to uniformly apply the laminate while achieving vacuum to ensure there are no air bubbles trapped. While the rapid application of the laminate has been described with respect to an exemplary process, it will be understood that applying the differential pressure may be accomplished in any combination of high and low pressures: low and lower, high and higher, and high and low.

Further, it will be understood that all potential laminates will have different characteristics and require different process parameters and that the finish of the laminate drives the draw ratio and, correspondingly, the overall manufacturing performance. The draw ratio is a measure of the overall extension of the laminate as it is stretched against the part surface. The draw ratio is laminate-dependent. Non-metalized laminates may have a draw ratio equal to or greater than 1:1. A metalized laminate, which has a metallic layer, may have a smaller draw ratio than its non-metalized counterpart. Such a metalized laminate may also take longer to heat to desired temperature that coincides with desired sag point of laminate.

After applying the differential pressure the article may be cooled. When the laminate is cooled it may be fully adhered to the article. Such cooling may include cooling the buck such as by passing fluid through the buck. The buck may act as a heat sink to aid with the cooling. Further, depending on the buck material chosen, the buck may work as a thermal conductor during heating and then as a thermal sink during the cooling process.

It is noted that the thermoforming process in the above describe embodiments of the invention have specific applicability to large parts (appliance panels, car doors, etc.), which have special requirements over small parts (cell phones, computer cases, etc.) because of the extra difficulties encountered with large parts and applying laminate without wrinkles, creases or tearing, especially given that the larger laminate tends to sag more, in absolute terms, than a smaller laminate. While the process does have special applicability to large parts, it can also be used with small parts, which is in contrast to current small part techniques that cannot be used on large parts.

Embodiments of the invention described herein use a method of laminating the laminate to a large part by controlling the temperature and pressure on the laminate and the large part to form a laminated part with enhanced aesthetic and/or functional characteristics. A laminated part, without having any tearing, creasing or delamination, is prepared. It is noted that the invention may be used for both metallic and non-metallic parts.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A method of applying a laminate having an adhesive layer to a contoured surface of a metal article, the method comprising: heating the laminate to a thermoformable temperature;
    after heating the laminate, applying a differential pressure across the laminate to pre-stretch the laminate and define a pre-stretched laminate;
    heating the metal article to a temperature above a bonding temperature of the adhesive, but below the thermoformable temperature;
    positioning the heated laminate above the heated article;
    after the pre-stretched laminate is defined, moving the metal article to initiate physical contact with the pre-stretched laminate; and
    after the physical contact, rapidly applying, within three seconds, the pre-stretched laminate onto the contoured surface by applying a differential pressure across the pre-stretched laminate to conform the pre-stretched laminate to the contoured surface without ripples in the pre-stretched laminate,
    wherein the rapidly applying the pre-stretched laminate further comprises applying the pre-stretched laminate before any portion of the adhesive falls below the bonding temperature.

2. The method of claim 1 wherein the applying the differential pressure across the pre-stretched laminate to conform the pre-stretched laminate to the contoured surface without ripples in the pre-stretched laminate comprises evacuating fluid from below the pre-stretched laminate and pressurizing fluid above the pre-stretched laminate.

3. The method of claim 1 wherein the rapidly applying the pre-stretched laminate comprises instantaneously applying the pre-stretched laminate.

4. The method of claim 1 wherein the heating the laminate comprises heating both sides of the laminate.

5. The method of claim 1 wherein the heating the laminate comprises heating the laminate until the laminate reaches a predetermined draw ratio.

6. The method of claim 5 wherein the predetermined draw ratio is greater than 1:1.

7. The method of claim 1 wherein the applying the differential pressure comprises applying a low pressure, less than atmospheric pressure, on a first side of the pre-stretched laminate, which is a same side of the pre-stretched laminate as the metal article.

8. The method of claim 7 wherein the applying the differential pressure across the pre-stretched laminate to conform the pre-stretched laminate to the contoured surface without ripples in the pre-stretched laminate further comprises applying a high pressure, greater than the low pressure, on a second side of the pre-stretched laminate opposite the first side.

9. The method of claim 8 wherein the applying the high pressure comprises applying a pressure of at least 1 atmosphere.

10. The method of claim 9 wherein the applying the high pressure comprises fluidly coupling the second side to the atmosphere and then fluidly sealing the second side to the atmosphere and pressurizing the second side to greater than one atmosphere of pressure.

11. The method of claim 1 wherein the metal article includes openings and the rapidly applying the pre-stretched laminate onto the contoured surface includes removing air between the pre-stretched laminate and the metal article through the openings.

12. A method of applying a laminate having an adhesive layer to an article within a thermoforming box and fluidly separated by the laminate into a first portion, on one side of the laminate, and a second portion, on an opposite side of the laminate, and having a buck supporting the article in the one side, the method comprising:
    heating the laminate to a first temperature corresponding to a thermoforming temperature for the laminate;
    prior to bringing the laminate into contact with the article, applying a differential pressure across the laminate to pre-stretch the laminate and define a pre-stretched laminate;
    heating the article to a second temperature that is above an instantaneous bonding temperature for the adhesive but below the thermoforming temperature;
    after the pre-stretched laminate is defined, moving the heated article to initiate physical contact with the pre-stretched laminate; and
    applying a second pressure differential across the pre-stretched and heated laminate while the laminate is at the first temperature and the article is at the second temperature to draw the pre-stretched laminate across the article, within three seconds of the physical contact and without forming ripples in the pre-stretched laminate,
    wherein the pre-stretched laminate is applied to the article before any portion of the adhesive falls below the instantaneous bonding temperature.

13. The method of claim 12 wherein the heating the article comprises heating the buck to a temperature above the instantaneous bonding temperature for the adhesive but below the thermoforming temperature.

14. The method of claim 13 wherein the heating the article further comprises pre-heating the article exteriorly of the thermoforming box.

15. The method of claim 14 wherein the heating the article further comprises maintaining the article at the second temperature.

16. The method of claim 15 wherein the heating the laminate further comprises pre-heating the laminate exteriorly of the thermoforming box.

17. The method of claim 15 wherein the heating the laminate comprises heating both sides of the laminate.

18. The method of claim 12 wherein the heating the laminate comprises heating the laminate until the laminate reaches a predetermined draw ratio.

19. The method of claim 18 wherein the predetermined draw ratio is greater than 1:1.

20. The method of claim 12 wherein the applying the second differential pressure across the pre-stretched and heated laminate to draw the pre-stretched laminate across the article without forming ripples in the pre-stretched laminate comprises applying a low pressure, less than atmospheric pressure, to the first portion.

21. The method of claim 20 wherein the applying the low pressure comprises evacuating air from the first portion of the box through the buck.

22. The method of claim 21 wherein the applying the second differential pressure across the pre-stretched and heated laminate to draw the pre-stretched laminate across the article without forming ripples in the pre-stretched laminate further comprises applying a high pressure, greater than the low pressure, to the second portion of the box.

23. The method of claim 22 wherein the applying the high pressure comprises applying a pressure of at least 1 atmosphere.

24. The method of claim 23 wherein the applying the high pressure comprises fluidly coupling the second portion to the atmosphere and then fluidly sealing the second portion to the atmosphere and pressurizing the second portion to greater than one atmosphere of pressure.

25. The method of claim 12, further comprising cooling the article after applying the second differential pressure.

26. The method of claim 12 wherein the article includes openings and the drawing the laminate across the article without forming ripples in the laminate includes removing air between the laminate and the article through the openings.

27. The method of claim 1 wherein the applying the differential pressure across the pre-stretched and heated laminate to conform the pre-stretched laminate to the contoured surface without ripples in the pre-stretched laminate occurs after the heated article contacts a lowest point of the pre-stretched and heated laminate.

28. A method of applying a laminate having an adhesive layer to an article within a thermoforming box and fluidly separated by the laminate into an upper portion, on one side of the laminate, and a lower portion, on an opposite side of the laminate, and having a buck supporting the article, the method comprising:
   heating the laminate to a first temperature corresponding to a thermoforming temperature for the laminate;
   during a vacuum phase prior to bringing the laminate into contact with the article, applying a differential pressure across the laminate to pre-stretch the laminate and define a pre-stretched laminate by applying a low pressure to the upper portion and the lower portion;
   heating the article to a second temperature that is above an instantaneous bonding temperature for the adhesive but below the thermoforming temperature;
   moving the heated article to initiate physical contact with the pre-stretched laminate;
   exhausting the low pressure applied to the upper portion to increase pressure in the upper portion; and
   after the exhausting, applying a pressure differential across the pre-stretched and heated laminate while the laminate is at the first temperature and the article is at the second temperature to draw the pre-stretched laminate across the article without forming ripples in the pre-stretched laminate and within three seconds of the initial contact,
   wherein the pre-stretched laminate is applied to the article before any portion of the adhesive falls below the instantaneous bonding temperature.

29. The method of claim 28 wherein a degree of vacuum applied to the upper portion and the lower portion is equal during the vacuum phase.

30. The method of claim 28 wherein the moving and the exhausting occur sequentially.

31. The method of claim 1 wherein instantaneously applying the laminate comprises within 0.5 seconds of the initial contact.

* * * * *